(12) United States Patent
Yang

(10) Patent No.: US 11,353,149 B2
(45) Date of Patent: Jun. 7, 2022

(54) STRUCTURE FOR INSTALLING PIPE FIXING CLAMP INSTALLED IN INTERNAL STRUCTURAL PIPE OF SOUND ABSORBER

(71) Applicants: Hyundai Motor Company, Seoul (KR); Kia Motors Corporation, Seoul (KR)

(72) Inventor: Young-Dug Yang, Seoul (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 1047 days.

(21) Appl. No.: 15/982,274

(22) Filed: May 17, 2018

(65) Prior Publication Data

US 2019/0154176 A1    May 23, 2019

(30) Foreign Application Priority Data

Nov. 17, 2017  (KR) .................. 10-2017-0154063

(51) Int. Cl.

| | |
|---|---|
| F16L 21/06 | (2006.01) |
| F01N 13/18 | (2010.01) |
| F16L 21/02 | (2006.01) |
| F16L 33/04 | (2006.01) |
| F16L 55/035 | (2006.01) |
| F01N 1/02 | (2006.01) |

(52) U.S. Cl.
CPC ............ *F16L 21/065* (2013.01); *F01N 1/02* (2013.01); *F01N 13/1827* (2013.01); *F01N 13/1855* (2013.01); *F01N 13/1872* (2013.01); *F16L 21/02* (2013.01); *F16L 33/04* (2013.01); *F16L 55/035* (2013.01); *F01N 2230/00* (2013.01); *F01N 2470/02* (2013.01)

(58) Field of Classification Search
CPC .... F01N 1/02; F01N 13/1827; F01N 13/1855; F01N 13/1872; F01N 2230/00; F01N 2470/02; F16L 21/02; F16L 21/065; F16L 33/04; F16L 55/035
See application file for complete search history.

(56) References Cited

U.S. PATENT DOCUMENTS

| | | | |
|---|---|---|---|
| 3,891,049 A | 6/1975 | Stroezel et al. | |
| 2015/0047922 A1* | 2/2015 | Vollmer | F01N 1/24 181/264 |

FOREIGN PATENT DOCUMENTS

| | | |
|---|---|---|
| JP | 55154887 U | 11/1980 |
| JP | 4318269 A | 11/1992 |
| JP | 722558 Y2 | 5/1995 |
| JP | 2002174380 A | 6/2002 |
| KR | 19980053404 U | 10/1998 |
| KR | 1019990021275 A | 3/1999 |
| KR | 100257340 B1 | 2/2000 |
| KR | 20010019246 A | 3/2001 |
| KR | 1020010103384 A | 11/2001 |

* cited by examiner

*Primary Examiner* — Audrey B. Walter
(74) *Attorney, Agent, or Firm* — Slater Matsil, LLP

(57) ABSTRACT

A structure is provided for installing a pipe fixing clamp installed in a sound absorber. A part of a curved pipe portion of an internal structural pipe of the sound absorber is cut to form an exhaust gas flow space. The pipe fixing clamp having multiple holes is connected to the exhaust gas flow space.

20 Claims, 5 Drawing Sheets

STRUCTURE FOR INSTALLING PIPE FIXING CLAMP INSTALLED IN INTERNAL STRUCTURAL PIPE OF SOUND ABSORBER

CROSS-REFERENCE TO RELATED APPLICATIONS

This application claims priority to Korean Patent Application No. 10-2017-0154063, filed on Nov. 17, 2017, which application is hereby incorporated herein by reference.

TECHNICAL FIELD

The present invention relates to a structure for installing a pipe fixing clamp installed in an internal structural pipe of a sound absorber.

BACKGROUND

In general, in many cases, drilled holes are applied to an internal structural pipe of a sound absorber for NVH (noise, vibration, and harshness) tuning of an exhaust system.

In a case in which the drilled hole is applied, NVH properties vary in accordance with a position of the drilled hole, and in some instances, as illustrated in FIG. 1, a position may be applied to a curved pipe portion 11 of a pipe 10.

In the case in which a drilled hole 11a is applied to the curved pipe portion 11 of the pipe 10 as described above, there occurs a problem in that the drilled hole 11a is crushed or torn as illustrated in FIG. 1A. Therefore, the corresponding portion is not configured as a pipe bending portion, and the hole of an upper/lower shell type is applied.

If the upper/lower shell type is applied as described above, costs are increased and a large amount of investment costs are required.

Therefore, there is an acute need for a structure capable of reducing costs/investment costs. Therefore, the present invention proposes a structure for fastening a clamp having drilled holes, and thus proposes a structure for installing a pipe fixing clamp installed in an internal structural pipe of a sound absorber which is capable of greatly reducing costs and investment costs in the case in which the upper/lower shell type is applied.

The following documents are related to subject matter disclosed herein:

Korean Utility Model Application Laid-Open No. 20-1998-053404 (Oct. 7, 1998)

U.S. Pat. No. 3,891,049 (Jun. 24, 1975)

Japanese Patent Application Laid-Open No. H04-318269 (Nov. 9, 1992)

Japanese Patent Application Laid-Open No. 2002-174380 (Jun. 21, 2002)

SUMMARY

Embodiments of the present invention relate to a structure for installing a pipe fixing clamp installed in a sound absorber, in which a front/rear end of a curved pipe portion in the sound absorber is cut at a predetermined interval to form a space, and then the space is connected by a pipe fixing clamp having drilled holes, in order to prevent drilled holes from being crushed and torn when the drilled holes are applied to a curved pipe portion of an internal structural pipe of the existing sound absorber.

An exemplary embodiment of the present invention provides a structure for installing a pipe fixing clamp installed in a sound absorber. A part of a curved pipe portion of an internal structural pipe of the sound absorber is cut to form an exhaust gas flow space. The pipe fixing clamp has multiple drilled holes connected to the exhaust gas flow space. The pipe fixing clamp is made of metal, has a metal band shape, and is fastened by a bolt and a nut. Rubbers, which maintain gas tightness and prevent a pipe withdrawal, protrude at both sides of the drilled holes 101 formed in the pipe fixing clamp.

According to embodiments of the present invention, a structure for fastening the clamp having the drilled holes is adopted, and as a result, it is possible to obtain an effect of greatly reducing costs and investment costs in comparison with the upper/lower shell type applied to the related art.

In addition, according to embodiments of the present invention, the front/rear end of the curved pipe portion in the sound absorber is cut at a predetermined interval to form a space, and then the space is connected by the pipe fixing clamp having the drilled holes. As a result, it is possible to prevent the drilled holes from being crushed and torn when the drilled holes are applied to the curved pipe portion of the internal structural pipe of the existing sound absorber.

BRIEF DESCRIPTION OF THE DRAWINGS

FIGS. 2A and 2B are views illustrating states of a curved pipe portion of an internal structural pipe of a sound absorber according to the present invention, in which FIG. 2A is a view illustrating a state in which an exhaust gas flow space is ensured in the curved pipe portion, and FIG. 2B is a view illustrating a state in which a clamp is fastened to the exhaust gas flow space.

FIGS. 4A and 4B are enlarged views of main parts A and B illustrated in FIG. 3, in which FIG. 4A is a view illustrating a state in which the curved pipe portion of the internal structural pipe of the sound absorber is cut at a predetermined interval and the exhaust gas flow space is ensured, and FIG. 4B is a view illustrating a state in which the pipe fixing clamp of the present invention is fastened to the exhaust gas flow space.

FIGS. 5A and 5B are views illustrating another exemplary embodiment of the pipe fixing clamp according to the present invention, in which FIG. 5A is a perspective view of the pipe fixing clamp, and FIG. 5B is a cross-sectional view illustrating a state in which the pipe fixing clamp is fastened to the curved pipe portion.

DETAILED DESCRIPTION OF ILLUSTRATIVE EMBODIMENTS

Figure 1:
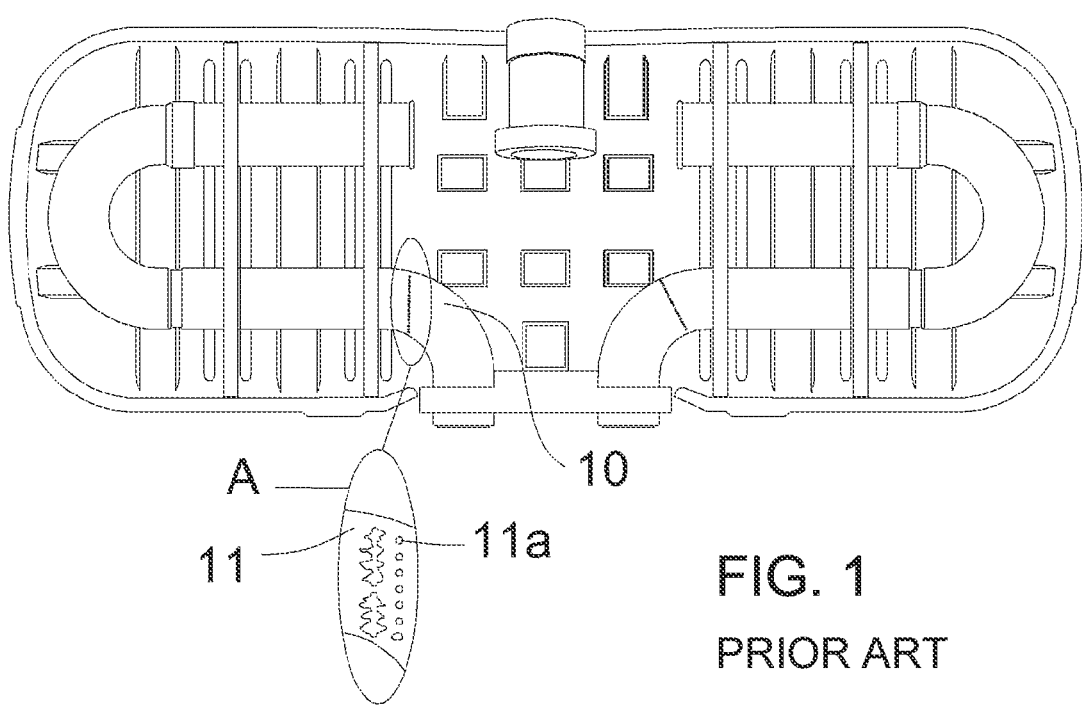
FIG. 1 is a view illustrating a state of a curved pipe portion of an internal structural pipe of a sound absorber in the related art.

Hereinafter, the present invention will be described in detail with reference to the accompanying drawings so that those skilled in the art to which the present invention pertains may easily carry out the present invention. However, the present invention may be implemented in various different ways, and is not limited to exemplary embodiments described herein.

A part irrelevant to the description will be omitted to clearly describe the present invention, and the same or similar constituent elements will be designated by the same reference numerals throughout the specification.

Terms or words used in the specification and the claims should not be interpreted as being limited to a general or dictionary meaning and should be interpreted as a meaning and a concept which conform to the technical spirit of the present invention based on a principle that an inventor can appropriately define a concept of a term in order to describe his/her own invention by the best method.

Hereinafter, an exemplary embodiment of the present invention will be described in detail with reference to the accompanying drawings.

Figure 2A:
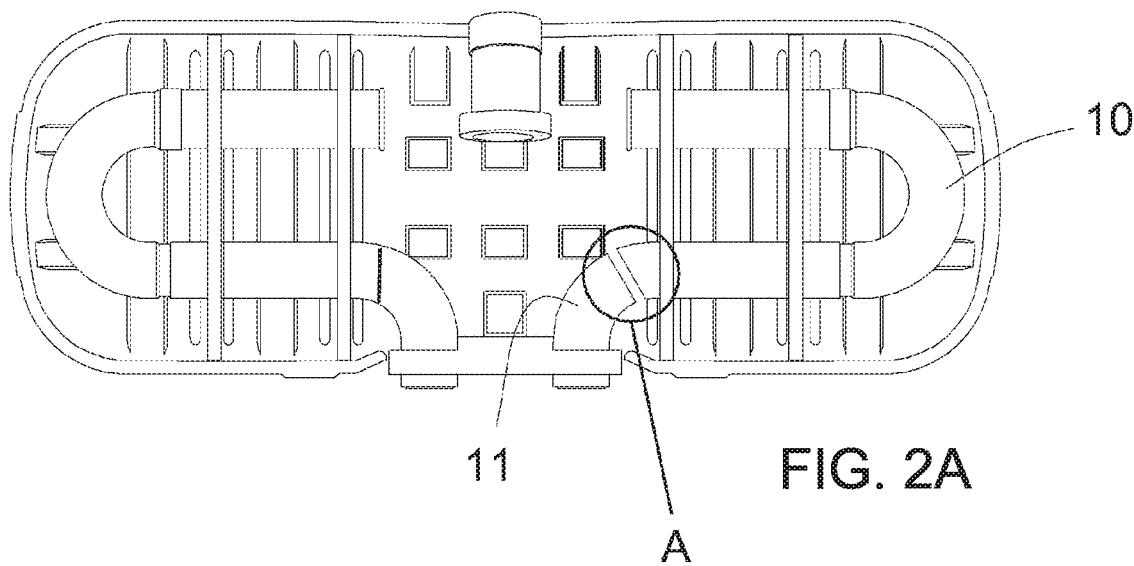
Figure 2B:
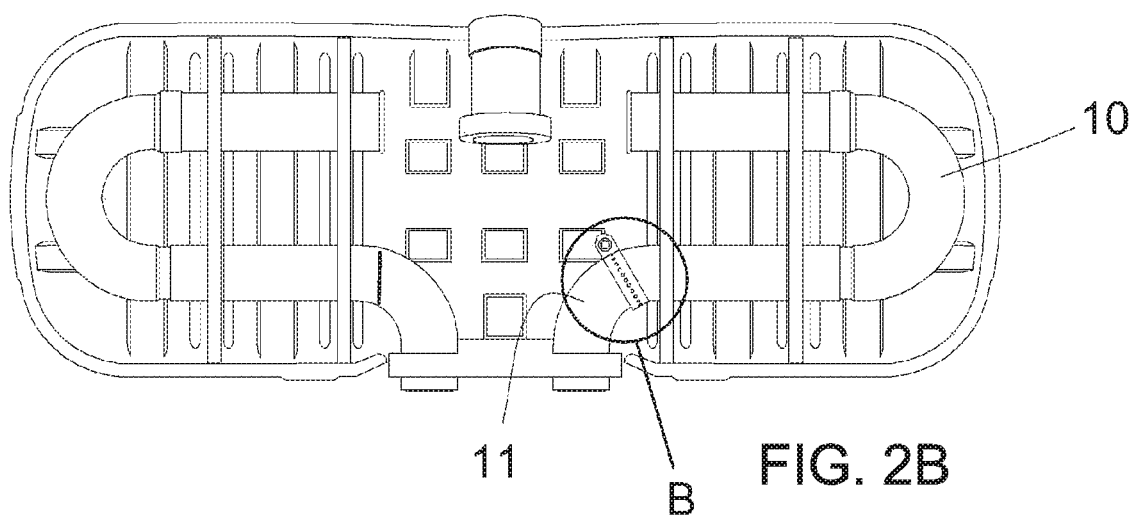
Figure 4A:
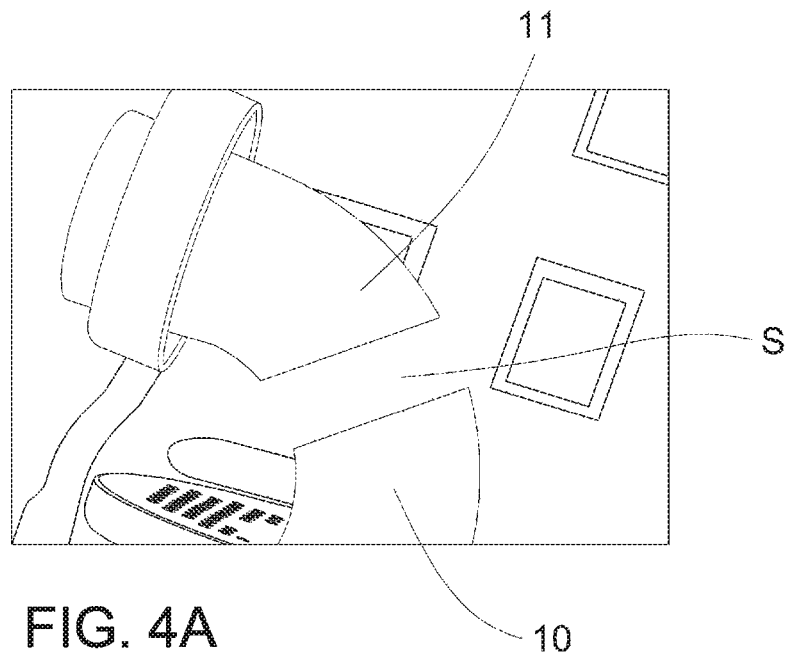
Figure 4B:
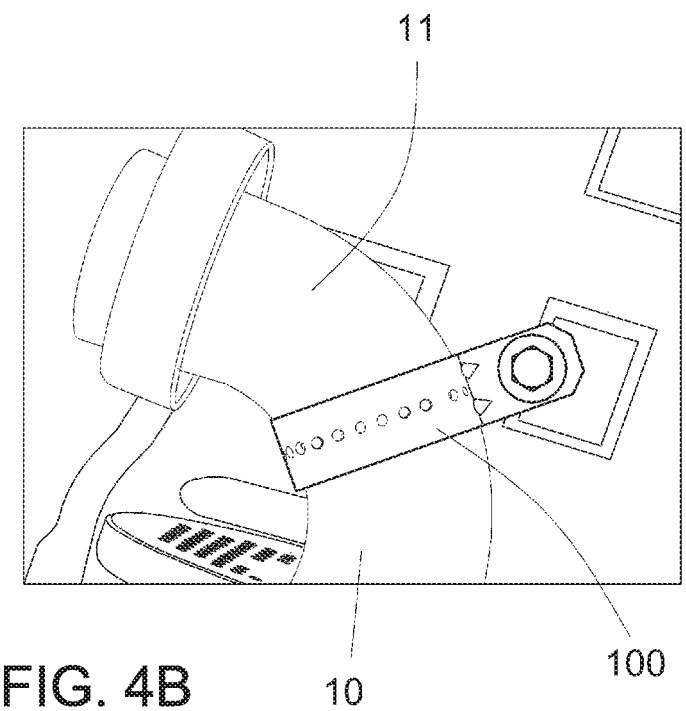

To prevent the drilled holes from being crushed and torn as illustrated in FIG. 1 when the drilled holes are applied to a curved pipe portion 11 of an internal structural pipe 10 of a sound absorber, the present invention is configured such that as illustrated in FIG. 2A or 4A, a front/rear end of the curved pipe portion 11 in the sound absorber is cut at a predetermined interval to ensure an exhaust gas flow space S, and as illustrated in FIG. 2B or 4B, a pipe fixing clamp 100 having drilled holes 101 is connected to the exhaust gas flow space S.

As described above, the pipe fixing clamp 100 of the present invention is installed in the exhaust gas flow space S, and as a result, it is possible to implement an NVH performance at the same level as a case in which the drilled holes are applied to the internal structural pipe of the existing sound absorber.

Figure 3:
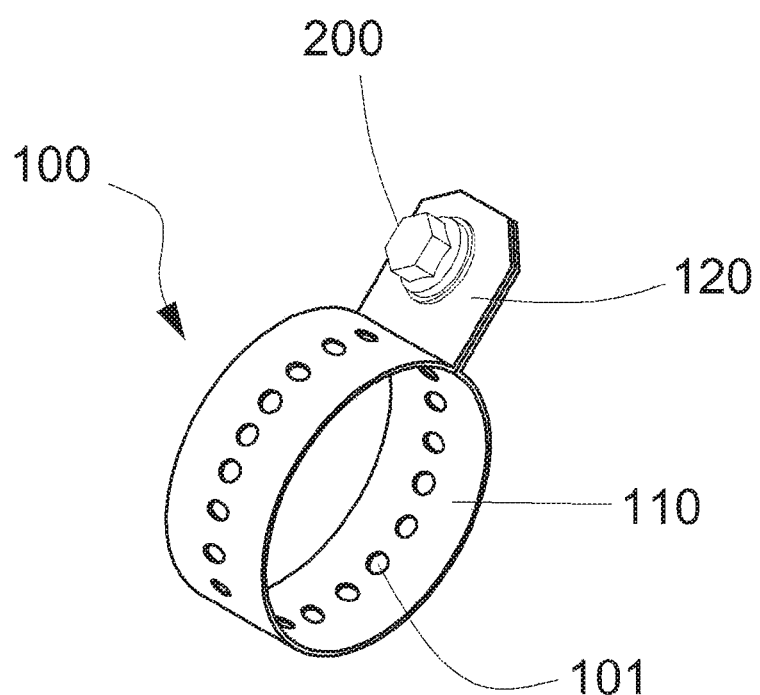
FIG. 3 is a perspective view of a pipe fixing clamp according to the present invention.

As illustrated in FIG. 3, the pipe fixing clamp 100 is made of metal and has a band shape, and the pipe fixing clamp 100 is fastened by a bolt and a nut 200 (see FIG. 4B).

In more detail, a body 110 of the pipe fixing clamp 100, which is made by forming multiple drilled holes 101 in a band-shaped plate, covers the curved pipe portion 11, and then the bolt and the nut 200 are fastened through holes (not illustrated) formed in a combining portion 120 where ends of the body 110 are connected.

FIG. 4A is a view illustrating a state in which the curved pipe portion 11 of the internal structural pipe of the sound absorber is cut at a predetermined interval to ensure the exhaust gas flow space S, and FIG. 4B is a view illustrating a state in which the pipe fixing clamp 100 of the present invention is fastened to the exhaust gas flow space S.

Figure 5A:
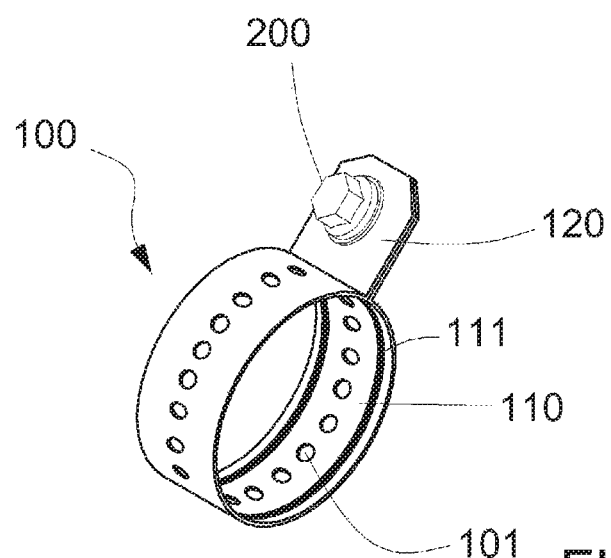
Figure 5B:
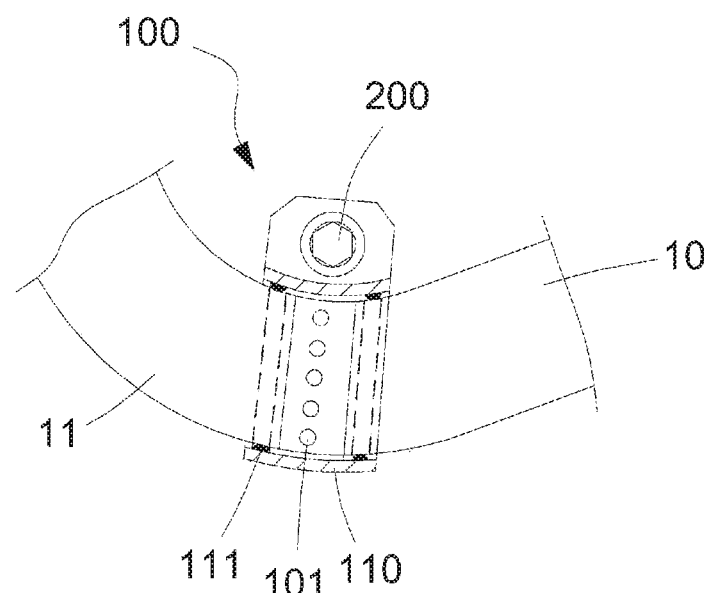

FIGS. 5A and 5B are views illustrating another exemplary embodiment of the pipe fixing clamp according to the present invention, in which FIG. 5A is a perspective view of the pipe fixing clamp, and FIG. 5B is a cross-sectional view illustrating a state in which the pipe fixing clamp is fastened to the curved pipe portion.

Here, a basic configuration of the pipe fixing clamp according to the present invention is identical to that in the present exemplary embodiment, but in the present exemplary embodiment, rubbers 111, which maintain gas tightness and prevent a pipe withdrawal, protrude at both sides of the drilled holes 101 formed in the pipe fixing clamp 100.

The rubber 111 protrudes in a band shape along an inner wall of the body 110 of the pipe fixing clamp 100.

Therefore, when the pipe fixing clamp 100 is fastened to both ends of the curved pipe portion 11, the rubbers 111 are in surface-to-surface contact with the curved pipe portion 11, thereby serving to prevent the pipe fixing clamp 100 from being separated from the curved pipe portion 11 due to swaying that occurs when the vehicle travels, and to attenuate vibration.

The rubbers 111 maintain gas tightness so that exhaust gas may be discharged always only through the drilled holes 101 formed in the pipe fixing clamp 100.

The aforementioned drilled holes 101 formed in the pipe fixing clamp 100 are formed at an equal interval in a single row in the drawing, but the drilled holes 101 may be formed in two or three rows.

The rubbers 111 protrude in a band shape at both sides based on the drilled holes 101, but the rubbers 111 may be formed in an overall interior of the body 110 of the pipe fixing clamp 100 or may be formed to protrude at the entire portion except for the drilled holes 101.

While the present invention has been described with reference to the exemplary embodiment and the accompanying drawings, different exemplary embodiments may be implemented within the spirit and the scope of the present invention. Therefore, it should be construed that the scope of the present invention is defined by the appended claims, and is not limited to the particular exemplary embodiment disclosed in the present specification.

What is claimed is:

1. A structure for use with a sound absorber, the structure comprising:
   a first pipe portion of an internal structural pipe of the sound absorber;
   a second pipe portion of the internal structural pipe of the sound absorber, the second pipe portion spaced from the first pipe portion; and
   a pipe fixing clamp installed at a space between the first pipe portion and the second pipe portion, the pipe fixing clamp having multiple holes through which an interior and an exterior of the internal structural pipe can communicate with each other.

2. The structure of claim 1, wherein the space is formed by cutting the internal structural pipe to separate the first pipe portion from the second pipe portion.

3. The structure of claim 1, wherein the pipe fixing clamp is installed at the space so that exhaust gas can pass therethrough.

4. The structure of claim 1, wherein the first and second pipe portions are spaced apart from each other such that exhaust gas passes through the holes positioned in the pipe fixing clamp.

5. The structure of claim 1, wherein the first pipe portion comprises a curved pipe portion.

6. The structure of claim 5, wherein the second pipe portion comprises a curved pipe portion.

7. A structure for use with a sound absorber, the structure comprising:
   a first pipe portion of an internal structural pipe of the sound absorber;
   a second pipe portion of the internal structural pipe of the sound absorber, the second pipe portion spaced from the first pipe portion;
   a pipe fixing clamp installed at a space between the first pipe portion and the second pipe portion, the pipe fixing clamp having multiple holes through which an interior and an exterior of the internal structural pipe can communicate with each other;
   a first rubber attached to the first pipe portion adjacent the space; and
   a second rubber attached to the second pipe portion adjacent the space.

8. The structure of claim 7, wherein the space is formed by cutting the internal structural pipe to separate the first pipe portion from the second pipe portion.

9. The structure of claim 7, wherein the pipe fixing clamp is installed at the space so that exhaust gas can pass therethrough.

10. The structure of claim 7, wherein the first and second pipe portions are spaced apart from each other such that exhaust gas passes through the holes positioned in the pipe fixing clamp.

11. The structure of claim 7, wherein the first pipe portion comprises a curved pipe portion.

12. The structure of claim 11, wherein the second pipe portion comprises a curved pipe portion.

13. A structure for use with a sound absorber, the structure comprising:
- a first pipe portion of an internal structural pipe of the sound absorber;
- a second pipe portion of the internal structural pipe of the sound absorber, the second pipe portion spaced from the first pipe portion; and
- a pipe fixing clamp made of metal and installed at a space between the first pipe portion and the second pipe portion, the pipe fixing clamp having multiple holes through which an interior and an exterior of the internal structural pipe can communicate with each other.

14. The structure of claim 13, wherein the space is formed by cutting the internal structural pipe to separate the first pipe portion from the second pipe portion.

15. The structure of claim 13, wherein the pipe fixing clamp is installed at the space so that exhaust gas can pass therethrough.

16. The structure of claim 13, wherein the first and second pipe portions are spaced apart from each other such that exhaust gas passes through the holes positioned in the pipe fixing clamp.

17. The structure of claim 13, wherein the pipe fixing clamp has a metal band shape.

18. The structure of claim 17, wherein the pipe fixing clamp is fastened by a bolt and a nut.

19. The structure of claim 13, wherein the first pipe portion comprises a curved pipe portion.

20. The structure of claim 19, wherein the second pipe portion comprises a curved pipe portion.

* * * * *